United States Patent [19]

Senger et al.

[11] Patent Number: 5,545,106
[45] Date of Patent: Aug. 13, 1996

[54] METHOD FOR ADJUSTING THE TRANSMISSION RATIO OF A TRANSMISSION

[75] Inventors: Karl-Heinz Senger, Löchgau; Gerhard Keuper, Leonberg; Peter Bäuerle, Ludwigsburg, all of Germany

[73] Assignee: Robert Bosch GmbH, Stuttgart, Germany

[21] Appl. No.: 356,177

[22] PCT Filed: Apr. 13, 1994

[86] PCT No.: PCT/DE94/00401

§ 371 Date: Dec. 16, 1994

§ 102(e) Date: Dec. 16, 1994

[87] PCT Pub. No.: WO94/24465

PCT Pub. Date: Oct. 27, 1994

[30] Foreign Application Priority Data

Apr. 16, 1993 [DE] Germany ............... 43 12 415.1

[51] Int. Cl.[6] ............... B60K 41/12; F16H 59/06; F02D 41/04
[52] U.S. Cl. ............... 477/43; 477/48
[58] Field of Search ............... 477/43, 48, 905

[56] References Cited

U.S. PATENT DOCUMENTS

| 4,353,272 | 10/1982 | Schneider et al. | 477/43 |
|---|---|---|---|
| 4,589,302 | 5/1986 | Oda et al. | 477/43 |
| 4,720,793 | 1/1988 | Watanabe et al. | 477/48 |
| 4,727,771 | 3/1988 | Niwa et al. | 477/48 |
| 4,833,944 | 5/1989 | Tanaka | 477/43 |
| 4,872,115 | 10/1989 | Itoh et al. | 477/43 |
| 4,976,170 | 12/1990 | Hayashi et al. | 477/43 |
| 5,152,192 | 10/1992 | Koenig et al. | 477/120 |

FOREIGN PATENT DOCUMENTS

| 0369446 | 5/1990 | European Pat. Off. . |
|---|---|---|
| 0406615 | 1/1991 | European Pat. Off. . |
| 0602672 | 6/1994 | European Pat. Off. . |
| WO93/00532 | 1/1993 | WIPO . |

*Primary Examiner*—Dirk Wright
*Attorney, Agent, or Firm*—Walter Ottesen

[57] ABSTRACT

The invention relates to a method of inputting the actual transmission ratio of a continuously variable transmission (CVT=continuously variable transmission) of a vehicle, especially a passenger motor vehicle. For this method, operating points of a shift characteristic field can be assumed which lie on a characteristic line of optimized consumption of a motor characteristic field of a motor of a vehicle. In this method, also operating points of the shift characteristic field can be assumed which lie on a characteristic line of optimized power of the motor characteristic field. The trace of the characteristic line of the shift characteristic field results from the particular selected characteristic line of the motor characteristic field. It is provided that operating points of the shift characteristic field can be assumed which lie on a dynamic characteristic line (c''') of the motor characteristic field. The dynamic characteristic line (c''') lies between the characteristic line (c') of the optimized consumption and the characteristic line (c'') of the optimized power. The position of the dynamic characteristic line (c''') is dependent upon the magnitude of the rate of change of the power demand.

4 Claims, 5 Drawing Sheets

METHOD FOR ADJUSTING THE TRANSMISSION RATIO OF A TRANSMISSION

FIELD OF THE INVENTION

The invention relates to a method for inputting the actual transmission ratio of a continuously variable transmission (CVT=continuously variable transmission) such as of a passenger motor vehicle wherein operating points of a shift characteristic field can be assumed. The operating points lie on a characteristic line of optimized consumption of a motor characteristic field of a motor of the motor vehicle. In the method, operating points of the shift characteristic field can also be assumed which lie on a characteristic line of optimized power of the motor characteristic field. The trace of the characteristic lines of the shift characteristic field results from the particular selected characteristic line of the motor characteristic field.

BACKGROUND OF THE INVENTION

Transmissions having continuous transmission ratio adjustment are available in the marketplace and operate utilizing hydraulic controls. Such controls are very complex.

Furthermore, electronically controlled continuously variable transmissions are known wherein a motor vehicle can be driven pursuant to driver command or automatically on different characteristic lines of a motor characteristic field of the motor. It is known to undertake this operation on the characteristic line of optimal consumption (efficiency) or on the characteristic line of optimal power. Shift characteristic lines of shift characteristic fields are derived from these respective characteristic lines of the motor characteristic field. These shift characteristic lines permit the known economy operation or sport operation of the transmission. It is disadvantageous that a relatively poor acceleration performance referred to a specific throttle flap change of the motor is present in the economy mode and that, in the sport mode, a high and therefore uneconomical rpm level is pregiven for a drive at constant speed.

SUMMARY OF THE INVENTION

The method of the invention affords the advantage compared to the above that a dynamic adjustment of the transmission ratio of the continuously variable transmission takes place so that especially a favorable, low rpm level in the economy mode is combined with excellent acceleration capacity. According to the invention, special characteristic lines in the motor characteristic field are selected for the derivation of the shift characteristic field of the dynamic control. The special characteristic lines in the motor characteristic field are selected in such a manner that (proceeding from the characteristic line of optimal or optimized consumption for a drive at constant speed) a power excess and therefore an improved acceleration is obtained from a change of the power demand. The power excess results in correspondence to the rate of change of the power demand. The transition from one operating point having optimized consumption to an operating point of optimized or desired power does not take place abruptly but rather continuously. Jumps in the characteristic field are therefore avoided. To realize an acceleration command of the driver of the motor vehicle, the relevant characteristic line is shifted correspondingly far in a direction toward the power optimized characteristic line. If the demand for a lesser acceleration is present, then the characteristic line is moved in the direction of the consumption-optimized characteristic line. The shift characteristic field of the invention results from these inputs. There, operating points can be assumed which lie on a dynamic characteristic line of the motor characteristic field running between the characteristic line of optimized consumption and the characteristic line of optimized power. As mentioned, the position of the dynamic characteristic line is dependent upon the magnitude of the rate of change of the power requirement.

According to another embodiment of the invention, the power demand corresponds to the position of the throttle flap of the motor and therefore the rate of change of the power demand corresponds to the rate of change of the throttle flap.

In view of the limit lines of the shift characteristic field, the shift characteristic field of the invention corresponds, on the one hand, to the shift characteristic field of the economy mode and, on the other hand, to the shift characteristic field of the sport mode. This causes a limit line of the shift characteristic field to correspond to a characteristic line assigned to optimized consumption and causes a further limit line of the shift characteristic field to correspond to a characteristic line assigned to optimized power.

DESCRIPTION OF THE PREFERRED EMBODIMENTS OF THE INVENTION

The characteristic lines of FIGS. 1 to 4 show the start point for the method according to the invention for inputting the actual transmission ratio of a continuously variable transmission (CVT) of a motor vehicle. An economy mode and also a sport mode are explained with respect to these characteristic lines as the method is known in the state of the art. On the basis of what is known, the invention will then be especially clear. The invention is made clear in FIGS. 5 and 6.

Figure 1:
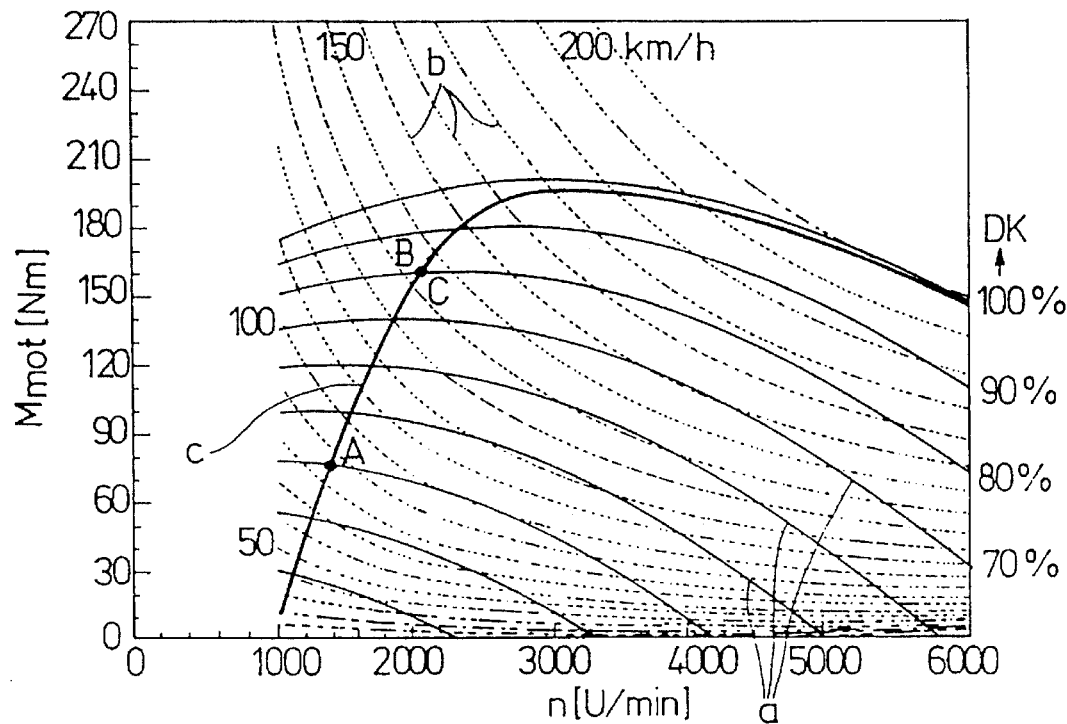
FIG. 1 is a motor characteristic field having a characteristic line of optimized consumption (efficiency)

FIG. 1 shows a motor characteristic field. Characteristic lines (a) are shown which show the motor torque $M_{mot}$ in dependence upon throttle flap angle DK. Furthermore, power hyperbolae (b) are plotted as they result with unaccelerated straight-ahead driving in a plane. A characteristic line of optimized consumption, that is optimized efficiency, is entered with (c). Accordingly, FIG. 1 shows a motor characteristic field of optimized consumption.

Figure 2:
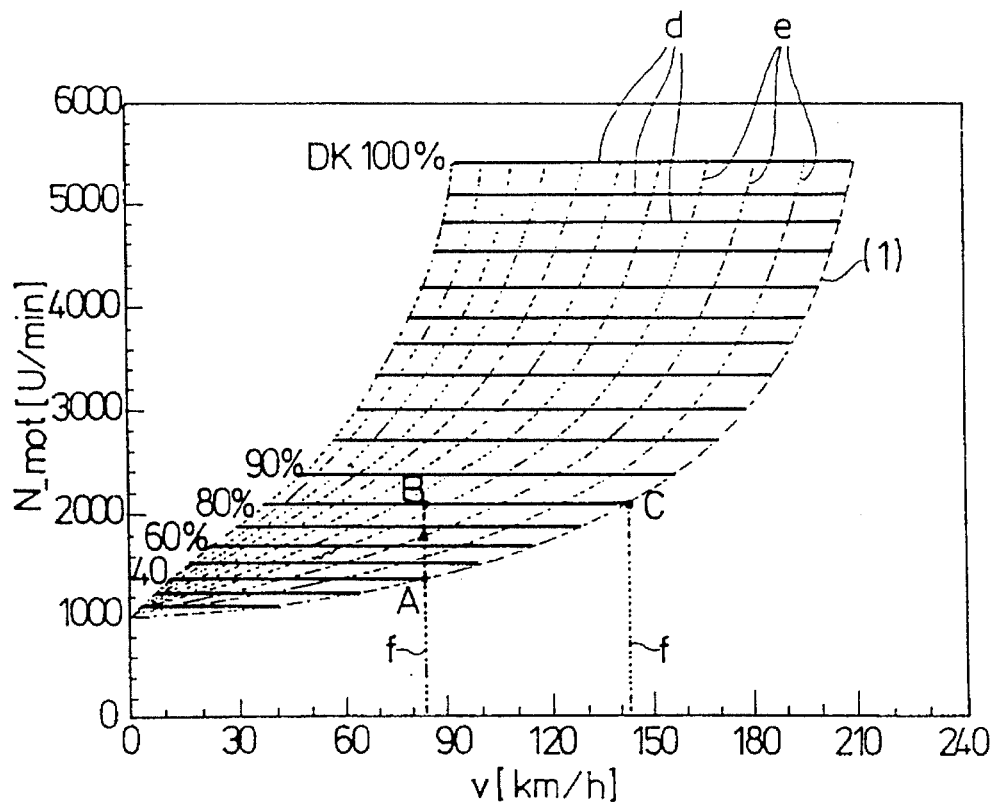
FIG. 2 is a shift characteristic field derived from the motor characteristic field of FIG. 1.

The shift characteristic field of FIG. 2 is derived from the motor characteristic field of optimized consumption. The horizontal lines (d) are lines of the same throttle flap angle. The positive-going lines (e) are lines of the same longitudinal acceleration of the motor vehicle. The driving speed (v) of the motor vehicle in km/h is plotted on the abscissa of the diagram of FIG. 2 so that the two dotted lines (f) define respective specific travel speeds.

Figure 3:
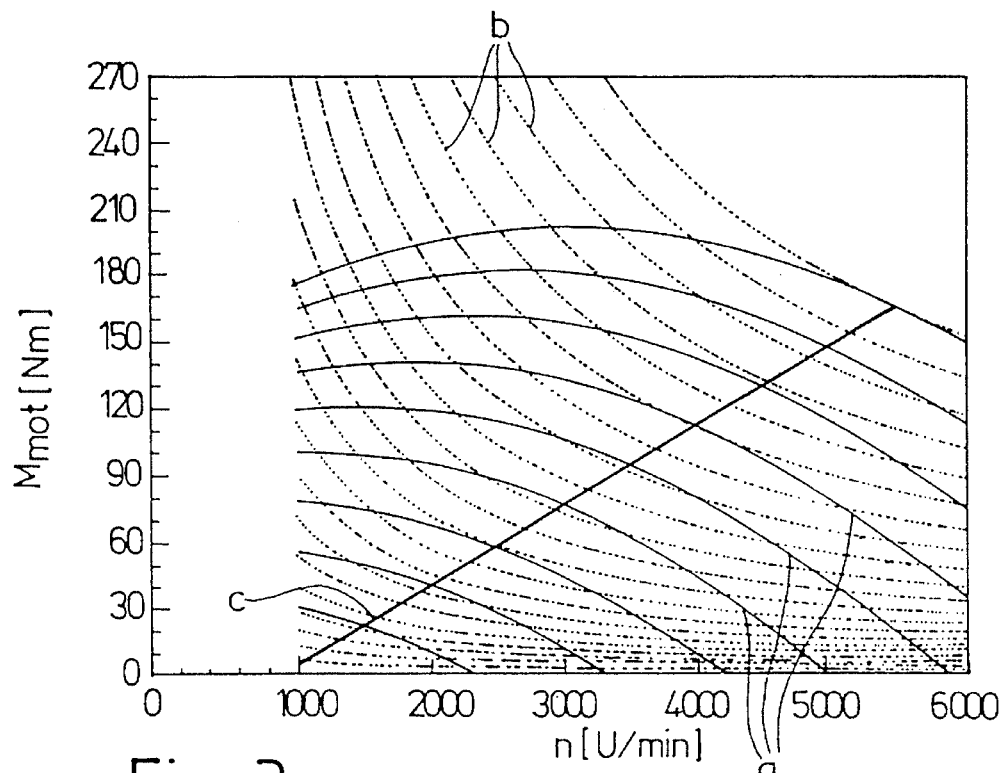
FIG. 3 is a motor characteristic field for optimized power.
Figure 4:
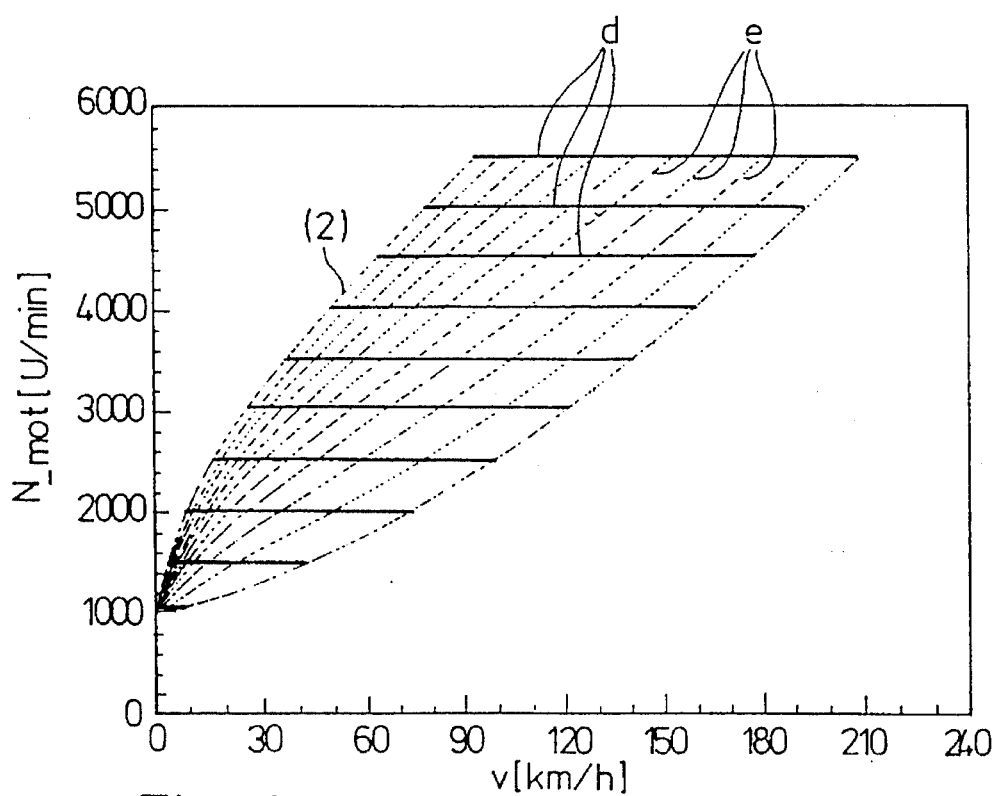
FIG. 4 is a shift characteristic field derived from the motor characteristic field of FIG. 3.

The motor characteristic field of FIG. 3 corresponds to the illustration of FIG. 1; however, not a characteristic field of optimized consumption is given but rather a characteristic field of optimized power. Correspondingly, another trace of characteristic line (c) results compared to the illustration of FIG. 1. The shift characteristic field of FIG. 4 is derived from the motor characteristic field of FIG. 3. FIG. 4 is therefore concerned with a shift characteristic field of optimized power.

The shift characteristic field of FIG. 2 is then a shift characteristic field in the economy mode; whereas, the shift characteristic field of FIG. 4 is a shift characteristic field in the sport mode.

From the foregoing, it is clear that in the derivation of the shift characteristic fields of the economy mode and of the sport mode, the premise was taken that, independent of driving state, only operating points on the consumption-optimized characteristic line and the power-optimized characteristic line, respectively, can be reached. The invention does not take this path. With the invention, also operating points which are consumption optimized or also power optimized can be approached; additionally, however, also operating points which lie between these two states can be approached.

Figure 5:
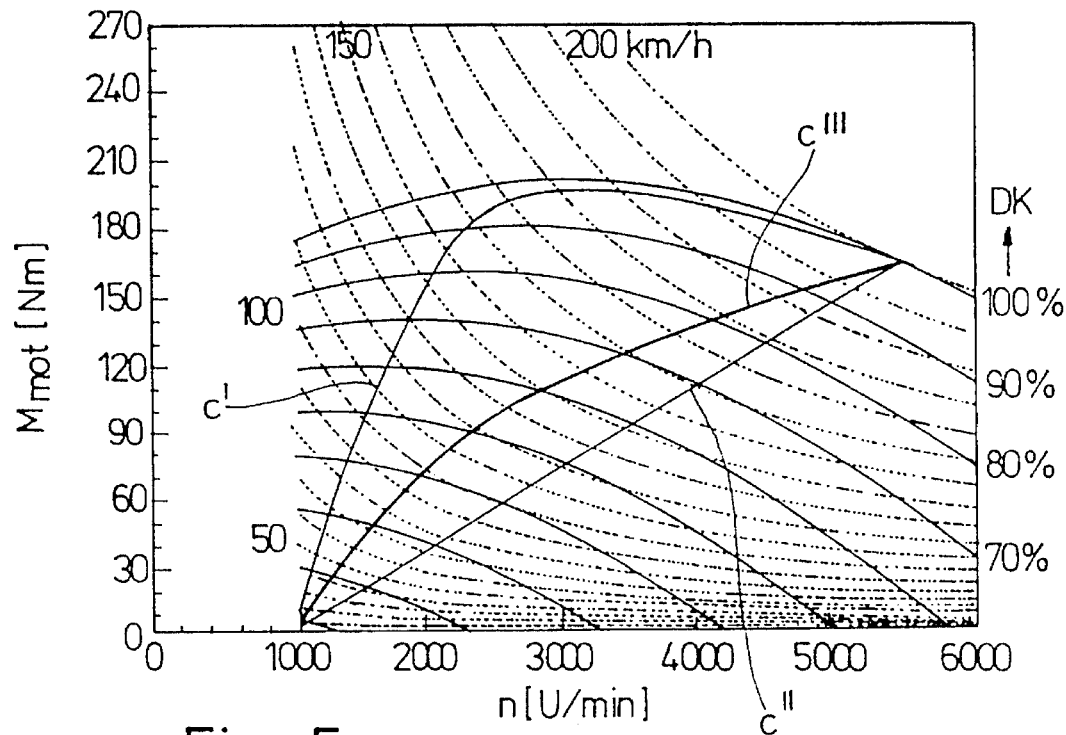
FIG. 5 is a motor characteristic field according to the dynamic method of the invention.
Figure 6:
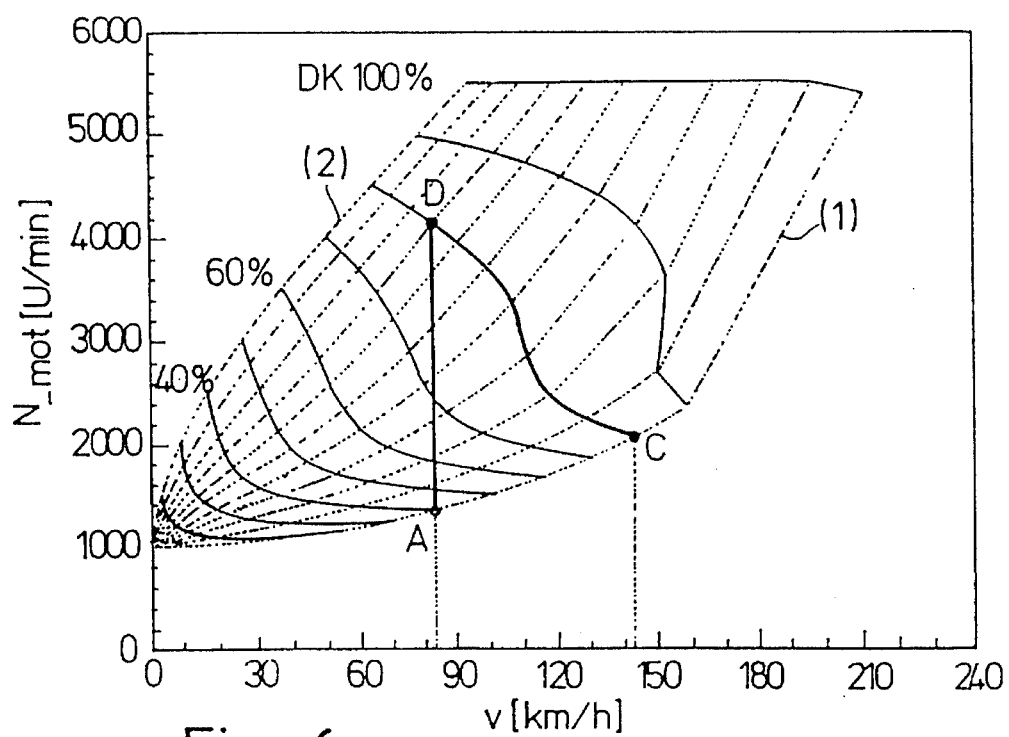
FIG. 6 is a shift characteristic field of the dynamic control derived from the motor characteristic field of FIG. 5.

FIG. 5 will now be considered for the purpose of clarification. FIG. 5 shows a diagram which corresponds to FIG. 1 or FIG. 3. In addition to the characteristic line of optimized consumption (shown as c' in FIG. 5), the characteristic line of optimized power is also shown and is identified by c". The characteristic lines c' and c" then correspond to the characteristic lines of FIGS. 1 and 3, respectively. From FIG. 5, it can be seen that a further characteristic line c'" is disposed between the characteristic line c' of optimized consumption and the characteristic line c" of optimized power. This is a dynamic characteristic line of the motor characteristic field which results between the characteristic lines c' and c" in dependence upon a dynamic operating parameter. This operating parameter is a change of the power demand on the motor and is preferably a rate of change of the power demand and especially a rate of change of the throttle flap of the motor. Based on the characteristic line c'" of the motor characteristic field, a corresponding shift characteristic field is configured in accordance with FIG. 6. The characteristic line c'" results based on the rate of change of the power demand. The selection criterion of the shift characteristic field is then the rate of change of the throttle flap of the motor. It can be especially provided that the economy mode remains active for slow changes of the throttle flap. This corresponds to the diagram of FIG. 2. The characteristic field of the dynamic control in accordance with FIG. 6 is applied for rapid changes of the position of the throttle flap. Any desired number of intermediate stages between the illustrations of FIG. 2 and FIG. 6 is possible for average rates of change. The extent to which the operating point is removed from the characteristic line of optimum efficiency (optimized consumption), is then made dependent upon the rate of change of the throttle flap. A separate sport mode is unnecessary with the control according to the invention.

The concept of the invention is, of course, not limited to the two extremes (characteristic line of optimized consumption and characteristic line of optimized power). It is of course also possible to utilize, or apply in an ancillary manner, other steady-state motor characteristic lines as output characteristic lines for the dynamic control according to the invention.

In addition, the control of the invention can be expanded in that, for high rates of change of the throttle flap, a steady-state characteristic line of optimized power is set in accordance with the shift characteristic field of FIG. 4 and that then, after a suitable time span or after exceeding a predetermined portion (for example 80%) of the steady-state terminal velocity or dropping below a remaining acceleration, the slow transition to the consumption-optimized characteristic line takes place. For sport-like driving, all preconditions are then given.

The invention is described in greater detail with respect to an embodiment. An operating point A is shown in FIG. 2. This operating point corresponds to a throttle flap position of 40% as well as to a speed (v) of 85 km/h. It is assumed that the driver of the motor vehicle carries out an acceleration maneuver. The driver opens the throttle flap to the position of 80%. In this way, the transmission control changes the transmission ratio of the continuously variable transmission in such a manner that a motor rpm of approximately 2,050 rev/min results. Accordingly, a transition from operating point A to operating point B has taken place. The motor vehicle accelerates up to an end speed of approximately 143 km/h (operating point C) with this constant rpm. The above-mentioned operating points A, B and C are likewise shown in FIG. 1. These operating points lie on the consumption-optimized characteristic line and the power, which is available at operating point B, is greater than the power made available for the constant travel at the start speed (operating point A). The excess is used for the acceleration until a new equilibrium state results at approximately 143 km/h.

In contrast to the foregoing, the dynamic control according to the invention with the same start values is explained with respect to FIG. 6. A start is made at operating point A at which a start speed of approximately 85 km/h is present. A motor rpm of approximately 4,800 rpm (operating point D) is set. For this throttle flap position which is now retained, the (identical) operating point C is approached with a significantly greater acceleration compared to the operation of FIG. 2. The motor characteristic field of FIG. 5 corresponds to the shift characteristic field of FIG. 6. in FIG. 5, it can be seen that the corresponding operating point is shifted far from the consumption-optimized characteristic line c" in the direction of characteristic line c' of optimized power as a consequence of the dynamic control. When the acceleration operation is ended, then a steady-state condition is again reached according to the invention at which driving can be with optimal consumption.

From the foregoing, it can be seen that, on the one hand, the line identified by 1 in FIG. 2 is identical to the line in FIG. 6 likewise identified by 1, and, on the other hand, there also exists identity between the characteristic lines identified by 2 in FIGS. 4 and 6. This is so because of the possibility to select, as required, a corresponding characteristic line from the motor characteristic field of FIG. 5, based on the two limit characteristic lines (optimized consumption as well as optimized power).

Figure 7:
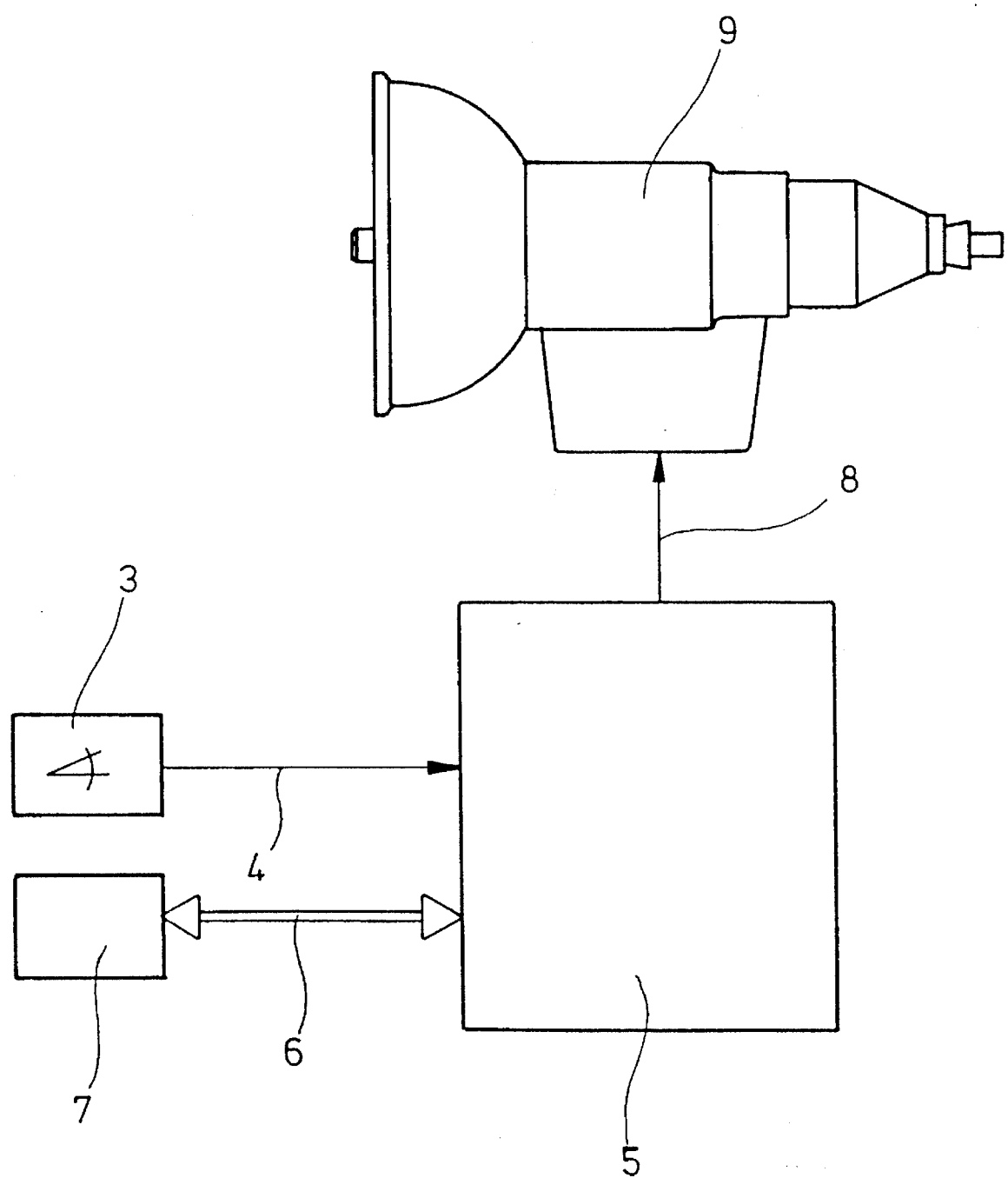
FIG. 7 is a block circuit diagram.

The embodiment of the invention preferred most will now be described with respect to the block circuit diagram of FIG. 7 and the structogram of FIG. 8. FIG. 7 shows a sensor 3 which detects the rate of change of the throttle flap of the motor of a vehicle and supplies the rate of change to a transmission control 5 via an electric connection 4. The transmission control 5 can exchange data with the motor control 7, that is, the motor of the vehicle via a data bus 6. The output of the transmission control is connected to a continuously variable transmission 9 via a connection 8 whereby the particular actual transmission ratio is adjusted.

Figure 8:
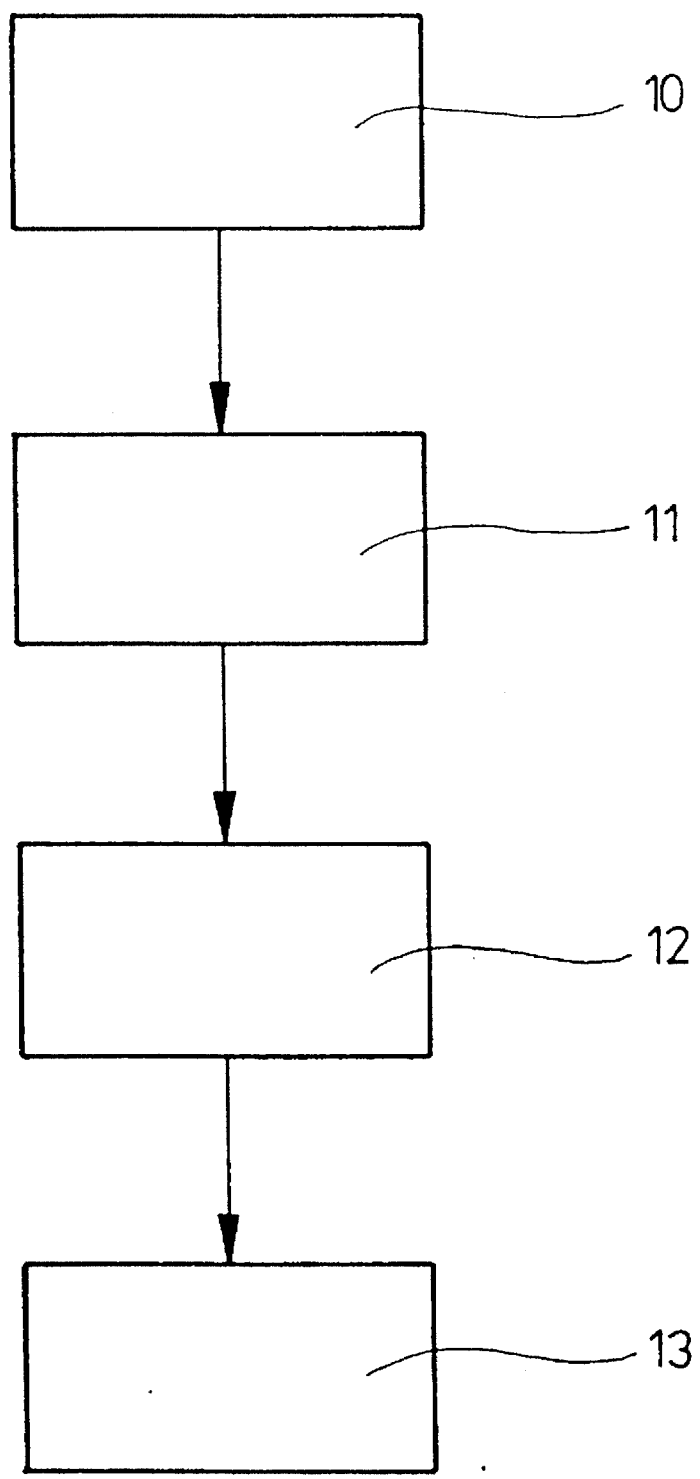
FIG. 8 is a structogram.

In the initial state 10 of FIG. 8, it is assumed that a steady-state straight-ahead travel of the vehicle is present so that the operating point lies on the line of optimal consumption. In method step 11, the throttle flap angle is changed and an acceleration operation should take place. Depending upon how large the rate of change of the power requirement is, the operation takes place first on the characteristic line of optimal power to achieve an acceleration value as high as possible. To avoid jumps in the characteristic field, the characteristic line is shifted in the direction of the consumption-optimal line in a manner similar to a demand for lesser acceleration (in step 12). If the maximum speed is assumed, which corresponds to the actual throttle flap position, then the operation is again carried out on the characteristic line of optimal efficiency in accordance with step 13.

According to the invention, a continuous transition is provided in the characteristic line fields. No jump takes place as in the state of the art. It is characteristic for the characteristic field of the invention that, when accelerating, first a higher motor rpm is adjusted compared to an operation in the economy mode. With increasing speed of the vehicle, the motor rpm is then reduced in such a manner that the motor again is driven on a characteristic line of optimal consumption (efficiency) for maximum speed resulting from the actual throttle flap position.

We claim:

1. A method of inputting an actual transmission ratio of a continuously variable transmission of a vehicle such as a passenger motor vehicle, the method comprising the steps of:

assuming operating points of a shift characteristic field which lie on a characteristic line (c') of optimized consumption of a motor characteristic field of a motor of a vehicle;

assuming operating points of said shift characteristic field which lie on a characteristic line (c") of optimized power of said motor characteristic field;

said characteristic lines of said shift characteristic field defining respective traces resulting from the respective characteristic lines of said motor characteristic field selected in each case; and, assuming these operating points of said shift characteristic field which lie on a dynamic characteristic line (c''') of said motor characteristic field with said dynamic characteristic line (c''') lying between said first characteristic line (c') and said second characteristic line (c") with the position of said dynamic characteristic line (c''') being dependent upon the magnitude of the rate of change of the power demand.

2. The method of claim 1, wherein the power demand corresponds to the position of the throttle flap of the motor and therefore the rate of change of the power demand corresponds to the rate of change of the throttle flap.

3. The method of claim 1 wherein a limit line of the shift characteristic field corresponds to a characteristic line assigned to an optimized consumption.

4. The method of claim 1, wherein a further limit line of the shift field corresponds to a characteristic line assigned to an optimized power.

* * * * *